April 19, 1949.  J. PRICE  2,467,567
TRIPOD FOR CAMERAS AND OTHER OBJECTS
Filed Dec. 17, 1946
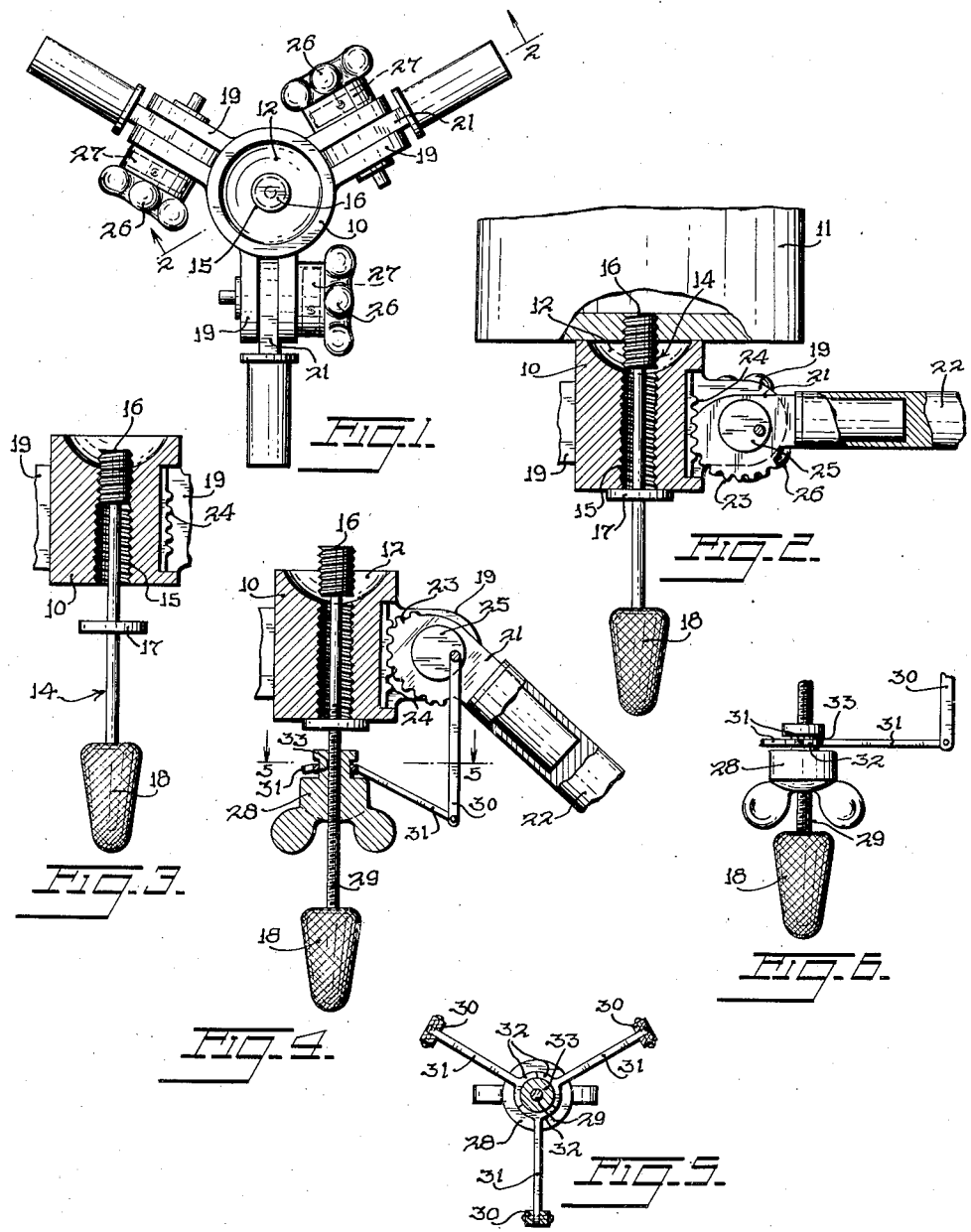
INVENTOR.
JERRY PRICE
BY
ATTORNEY Patented Apr. 19, 1949

2,467,567

UNITED STATES PATENT OFFICE 2,467,567

TRIPOD FOR CAMERAS AND OTHER OBJECTS

Jerry Price, Brooklyn, N. Y.

Application December 17, 1946, Serial No. 716,775

4 Claims. (Cl. 248—188)

1

This invention relates to tripods.

It is an object of the present invention to provide a simple and easy means for connecting a camera or other object to the top of a tripod wherein the attaching screw forming a part of this means can be detached from the camera without being detached from the tripod and whereby, by the same screwing action, the attaching screw may be removed from the tripod if desired.

It is another object of the present invention to provide a connection between the attaching screw for the attachment of a camera or the like and a tripod which may be operated so as to effect a release of the individual tripod legs by a screwing action of the member along the attaching screw for the camera or by screwing the camera attaching element itself will effect the same action upon the release connection associated respectively with the tripod legs whereby to release them from the central supporting structure for the camera or the like.

According to the invention, a central structure has three tripod legs connected to the same for angular adjustment with respect thereto. The upper ends of the legs have gear teeth and are respectively pivotally connected to the central structure. The gear teeth are adapted to mesh with gear teeth on the central structure whereby to retain the legs against angular displacement. An eccentric arrangement is associated with each of the legs and when operated will disengage the teeth of the legs from the teeth of the central structure. Extending through the center of the central structure is a threaded attaching screw for connecting a camera or the like to the top of the central structure.

As the attaching member or screw is screwed upwardly, it will engage with a threaded opening in the bottom of the camera and finally a flange on the screw will engage with the under surface of the central structure to finally make secure the camera to the central structure. If it is desired to remove the screw, the same is screwed downwardly out of engagement with the camera and through a threaded opening at the bottom of the central structure. Connected with the eccentric devices of the tripod legs are arms which extend downwardly.

According to a modified form of the invention these arms may be connected to a threaded sleeve adjustable vertically along the attaching screw for the camera. As this threaded screw is adjusted along the attaching screw the arms will be moved either outwardly or inwardly. If they are moved outwardly, the gearing will be disconnected between the legs and the central structure. The sleeve can also be moved vertically by the adjustment of the attaching screw. Members which extend radially inwardly from the arm can be detached at their inner ends from the threaded screw so that if desired the individual arm for the eccentric devices can be adjusted separately as when only one leg is to be adjusted at the particular time.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a top plan view of the central supporting structure with attaching portion of the legs extending outwardly therefrom.

Fig. 2 is a side elevational view taken partly in section on line 2—2 of Fig. 1, with the camera attached to the central structure, and the attaching screw being seated in the bottom of the camera.

Fig. 3 is a cross sectional view in elevation where the attaching screw has been withdrawn from the camera, the camera removed from the central structure and the screw being threaded into the lower portion of the central structure.

Fig. 4 is a cross sectional view of a modified form of the invention wherein the eccentric means for retaining and releasing the individual legs are connected with the depending attaching screw by means of a sleeve whereby upon adjustment of the sleeve along the screw or the adjustment of the screw all of the legs can be released for angular adjustment.

Fig. 5 is a transverse cross sectional view looking upon the operating mechanism for the eccentric release devices as viewed on line 5—5 of Fig. 4, looking in the direction of the arrows thereof.

Fig. 6 is a detail view showing in elevation the adjusting screw upon the attaching screw and the connection of one of the operating members within the groove of the sleeve.

Referring now to the figures, 10 represents a central structure on which a camera or the like 11 can be supported. This central structure has a depression or recess 12 in the top thereof and a threaded opening extending down through the bottom of the central structure from the recess and through which an attaching screw 14 can be adjusted. The opening is indicated at 15.

The attaching screw has an enlarged threaded portion 16 and a flange 17 adapted to abut with the bottom face of the central structure 10 when the attaching screw has been moved upwardly to such an extent that the enlarged threaded portion 16 has been thoroughly seated within the bottom of the camera to clamp the bottom to the top of the central structure. The camera will thereafter be retained in rigid engagement with the top of the central structure. The lower end of the attaching screw 14 has a narrow handle portion 18 by means of which the turning movement of the attaching screw 14 can be more easily effected.

To detach the camera 11, the attaching screw is turned so that its enlarged threaded end will leave the bottom of the camera and will become seated in its downward movement in the threaded portion 15 extending outwardly from the recess 12. The attaching screw will thus be retained within the central structure and prevented from dropping out of the same. If it is desired to remove the attaching screw completely, the continued turning movement will be effected until finally the enlarged threaded portion 16 will leave the bottom of the threaded opening 15.

Extending radially outwardly, 120° apart, are pairs of ears 19 between which is extended a member 21 carried on the upper end of a leg 22. This member has gear teeth 23 thereon adapted to engage with gear teeth 24 on the central structure. The member 21 is connected to the ears 19 by means of an eccentric device 25 operated by a handle 26 and a spring arrangement 27. When the handle 26 is turned, the eccentric device will be operated so as to cause the teeth upon the member 21 to be disengaged from the teeth 24 on the central structure 10. The spring 27 will serve to return the teeth 23 on the member 21 to the teeth 24 when the handle or arm 26 is released. While the member 21 is disengaged from the central structure teeth 24, an angular adjustment of the leg 22 can be effected.

Referring now particularly to Figs. 4, 5 and 6, there is shown a construction whereby all of the eccentric devices 25 can be operated at the same time by a sleeve 28 carried on a threaded portion 29 of the attaching screw 14. Extra long arms 30 are provided for operating the eccentric devices 25. The lower ends of these arms have links 31 pivotally connected to them. The inner ends of these links 31 have forked portions 32 extending throughout an arc of about 120° and into a specially formed recess 33 in the sleeve 28. As the sleeve 28 is adjusted along the threaded portion 29 of the attaching screw 14, the links 31 will be moved outwardly and the gear teeth 23 of the member 21 released from the gear teeth 24. An adjustment of the sleeve 28 will permit the eccentric devices by means of the spring 27 to return the member 21 so that the teeth 23 will be in engagement with the teeth 24. The groove 33 is so shaped that if it is desired to release only one of the eccentric devices, the link 31 can be pivoted outwardly and out of the groove 33 so that the arm 30 for the particular device 25 can be adjusted independently of the sleeve 28. While adjustment of the eccentric devices can be effected by adjusting the sleeve 28 over the portion 29, it will be apparent that the arrangement can be so set up that by adjusting the attaching screw 14 itself the eccentrics can be simultaneously operated. By withdrawing the attaching screw 14 to release the camera 11, the tripod can be simultaneously dismantled with the same action. If no adjustment of the eccentrics are desired at the time that the attaching screw is being adjusted, the sleeve 28 will be retained with one hand while the attaching screw 14 is adjusted with the other.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A tripod arrangement comprising a central structure having a recess in its top and a threaded opening depending downwardly therefrom to the bottom of the structure, tripod legs connected to the central structure to support the same above the ground, an attaching screw having a threaded portion adjustable through the threaded portion at the bottom of the central structure and adapted to engage with the bottom of a camera or the like which is to be supported upon the central structure and to enter a threaded hole within the same to fix the camera to the top of the central structure, means for connecting the legs to the central structure so that they may be released to be angularly adjusted, devices associated with the legs to temporarily disengage them from the central structure so as to free them for angular adjustment, said devices including angularly adjustable arms, said attaching screw having a member axially adjustable on the same and means extending between the member and the arm to effect the adjustment of the arm whereby to release the legs as the member is adjusted upon the attaching screw.

2. A tripod arrangement comprising a central structure having a recess in its top and a threaded opening depending downwardly therefrom to the bottom of the structure, tripod legs connected to the central structure to support the same above the ground, an attaching screw having a threaded portion adjustable through the threaded portion at the bottom of the central structure and adapted to engage with the bottom of a camera or the like which is to be supported upon the central structure and to enter a threaded hole within the same to fix the camera to the top of the central structure, means for connecting the legs to the central structure so that they may be released to be angularly adjusted, devices associated with the legs to temporarily disengage them from the central structure so as to free them for angular adjustment, said devices including angularly adjustable arms, said attaching screw having a member axially adjustable on the same, means extending between the member and the arm to effect the adjustment of the arm whereby to release the legs as the member is adjusted upon the attaching screw, said arm depending downwardly from the central structure, said member on the attaching screw being in the form of an internally threaded sleeve and said attaching screw having cooperating external threads thereon, said means connecting the sleeve with the arm comprising a link adapted to be forced inwardly or outwardly as the axial adjustment of the sleeve upon the attaching screw is effected.

3. A tripod arrangement comprising a central structure having a recess in its top and a threaded opening depending downwardly therefrom to the bottom of the structure, tripod legs connected to the central structure to support the same above the ground, an attaching screw having a threaded portion adjustable through the threaded portion at the bottom of the central structure and adapted to engage with the bottom of a camera or the like which is to be supported upon the central structure and to enter a threaded hole within the same to fix the camera to the top of the central structure, means for connecting the legs to the central structure so that they may be released to be angularly adjusted, devices associated with the legs to temporarily disengage them from the central structure so as to free them for angular adjustment, said devices including angularly adjustable arms, said attaching screw having a member axially adjustable on the same, means extending between the member and the arm to effect the adjustment of the arm whereby to release the legs as the member is adjusted upon the attaching screw, said arm depending downwardly from the central structure, said member on the attaching screw being in the form of an internally threaded sleeve and said attaching screw having cooperating external threads thereon, said means connecting the sleeve with the arm comprising a link adapted to be forced inwardly or outwardly as the axial adjustment of the sleeve upon the attaching screw is effected, said sleeve having a groove, said link having a forked formation adapted to extend partially around the groove and the sleeve, said groove and forked formation of the link being so constructed that the link may be pivoted out of the groove whereby one of the devices can be effected separately to effect the adjustment of but one leg.

4. A tripod arrangement comprising a central structure having a recess in its top and a threaded opening depending downwardly therefrom to the bottom of the structure, tripod legs connected to the central structure to support the same above the ground, an attaching screw having a threaded portion adjustable through the threaded portion at the bottom of the central structure and adapted to engage with the bottom of a camera or the like which is to be supported upon the central structure and to enter a threaded hole within the same to fix the camera to the top of the central structure, means for connecting the legs to the central structure so that they may be released to be angularly adjusted, devices associated with the legs to temporarily disengage them from the central structure so as to free them for angular adjustment, said device including angularly adjustable arms, said attaching screw having a member axially adjustable on the same, means extending between the member and the arm to effect the adjustment of the arm whereby to release the legs as the member is adjusted upon the attaching screw, said arm depending downwardly from the central structure, said member on the attaching screw being in the form of an internally threaded sleeve and said attaching screw having cooperating external threads thereon, said means connecting the sleeve with the arm comprising a link adapted to be forced inwardly or outwardly as the axial adjustment of the sleeve upon the attaching screw is effected, said member on the attaching screw being secured thereto to be elevated or lowered with the axial movement of the attaching screw.

JERRY PRICE.

REFERENCES CITED

The following references are of record in the file of this patent:

UNITED STATES PATENTS

| Number | Name | Date |
|---|---|---|
| 413,118 | Warner | Oct. 15, 1889 |
| 931,773 | Kroedel | Aug. 24, 1909 |
| 2,244,089 | Swartz | June 3, 1941 |

FOREIGN PATENTS

| Number | Country | Date |
|---|---|---|
| 309,861 | Italy | July 19, 1933 |